United States Patent [19]

Klein et al.

[11] 3,887,853

[45] June 3, 1975

[54] STABILIZING SYSTEM FOR AN INVERTER-DRIVEN INDUCTION MOTOR

[75] Inventors: Frank N. Klein; Gerald F. O'Callaghan, both of Kenosha, Wis.

[73] Assignee: Eaton Corp., Cleveland, Ohio

[22] Filed: Dec. 14, 1973

[21] Appl. No.: 424,725

[52] U.S. Cl. .................. 318/230; 318/231; 318/307
[51] Int. Cl. .............................................. A02p 7/42
[58] Field of Search ........... 318/227, 230, 231, 307, 318/448

[56] References Cited
UNITED STATES PATENTS

| | | | |
|---|---|---|---|
| 3,372,323 | 3/1968 | Guyeska | 318/230 |
| 3,512,067 | 5/1970 | Landau | 318/227 |
| 3,671,831 | 6/1972 | Chausse et al. | 318/227 |
| 3,700,986 | 10/1972 | Cushman et al. | 318/227 |
| 3,743,906 | 7/1973 | Torok | 318/231 X |
| 3,753,064 | 8/1973 | Agarwal et al. | 318/231 X |

*Primary Examiner*—G. Z. Rubinson
*Attorney, Agent, or Firm*—Teagno & Toddy

[57] ABSTRACT

In a motor control system in which an induction motor is driven by an inverter and the motor tends to resonate, the resonant frequency of the motor and the extent of its damping are adjusted to desirable amounts by a local feedback circuit. An output signal of the local feedback circuit is algebraically added to a speed command voltage for the motor control system. A sum signal thus produced is connected to the input of the inverter to control the motor speed. The sum signal is also employed as one of two input signals to the local feedback circuit, the second input signal being proportional to the speed of the rotor of the motor and obtained from a sensor connected with the rotor shaft. The two input signals to the local feedback circuit are subtracted and their difference signal is processed through a lag circuit and a filter network to produce the output signal of the local feedback circuit. When the inverter and motor are thus stabilized by the local feedback circuit just described, it is much easier to stabilize a larger speed-control feedback loop in which the inverter and motor may be employed.

15 Claims, 3 Drawing Figures

STABILIZING SYSTEM FOR AN INVERTER-DRIVEN INDUCTION MOTOR

BACKGROUND OF THE INVENTION

Induction motors driven by inverters have been employed in the prior art where speed control of an ac motor is required. Induction motors do not operate synchronously because, in order to produce output torque, some slip is necessary between the mechanical frequency of the rotor and the frequency of electric fields applied to the stator by the inverter. One system of the prior art obtains a feedback signal representative of motor speed directly from the motor shaft and utilizes that feedback signal in a closed-loop control system to cause the rotor speed to track an input speed command voltage. A system of this type that employs feedback pulses from a sensor on the rotor shaft is described in a patent application by Gerald O'Callaghan entitled, "CONTROLLED VELOCITY DRIVE," Ser. No. 240,221, filed Mar. 31, 1972, now U.S. Pat. No. 3,828,168, and which is made a part of this description by reference. A closed-loop control system of this type must be stabilized to prevent oscillation, but preferably in such a way as to avoid unduly sacrificing fast response.

The stabilization of induction motor control systems is hampered by a tendency of the motor alone to ring or resonate, even though it would not sustain oscillations continuously if operated in an open-loop arrangement. The motor itself is internally a closed-loop electrochemical energy conversion device, which can be represented by a model characterized mathematically by a "second-order" system equation. In a fast-response closed-loop control system such as a speed control system, the natural tendency of the motor to resonate may be magnified by other elements of the control system.

Consequently, a need has been felt for a means for damping the resonance of the motor with a local feedback loop in addition to any main feedback loop that may be employed. The inverter, the motor, and the local feedback loop then constitute a relatively well behaved set of components, perhaps critically damped, which can be employed in the larger main feedback loop, with resulting greater ease of stabilization of the system as a whole.

For damping the inverter and motor by means of a local feedback loop, a very appropriate signal for the input to a feedback network of the local feedback loop would be a signal proportional to the air-gap torque that the induction motor produces. Various approaches have been employed in the prior art to obtain such a signal, but the resulting signals have not represented the torque of the machine accurately because they often lack the proper phase or amplitude.

SUMMARY OF THE INVENTION

The present invention relates to inverter-driven induction motor systems, and in particular to systems employing induction motors of a type which would, in the absence of external damping, have a tendency to resonate. A local feedback circuit is provided for damping the inverter and motor alone, and is in addition to any larger feedback loops in which the inverter, motor, and local feedback circuit may be employed. The motor may be critically damped by the local feedback circuit, if that is desired. A feedback signal for damping is produced by first producing a signal voltage that is dependent upon the slip frequency of the induction motor and which is therefore approximately proportional over a range to the torque of the motor. The slip frequency is proportional to the difference between the mechanical frequency of rotation of the rotor and the electrical frequency of rotation of magnetic fields produced in the stator of the induction motor. The slip-related signal is then processed through a lag filtering network. The resulting signal at the output of the lag network is believed to simulate the air-gap torque of the motor. No such signal is directly accessible from the motor. The torque-simulating signal is applied to a filter network to produce a signal which is believed to be a very appropriate feedback signal for damping purposes. It is algebraically added to a principal speed command voltage, to produce a total signal for application to the input control terminal of the inverter.

Accordingly, one object of the present invention is to provide a damping system for inverter-driven induction motors that have a tendency to resonate, by a local feedback technique.

A further object is to provide a damping system for altering either the inherent resonant frequency or the amount of damping of an induction motor, or both the resonant frequency and the amount of damping.

Another object is to provide a damping system for induction motors by producing a local feedback signal that, before filtering, simulates the air-gap torque of the induction motor.

Still another object is to provide a damping system as above and in which a feedback signal for damping purposes is produced by first producing a signal representative of the slip of the induction motor, and by applying the slip-related signal to a phase-lag circuit and then to a phase-lead filter network to produce a feedback signal for algebraic addition to the principal input signal of the inverter.

An additional object is to provide a damping system for inverter-driven induction motors employing a local feedback loop, to facilitate stabilization of a larger main feedback loop, such as a speed-control main feedback loop, in which the inverter and motor are employed.

Still another object is to provide a damping system for an inverter-driven induction motor that is employed in a velocity-lock feedback system for precise control of the speed and angular position of the rotor of the motor.

DESCRIPTION OF DRAWINGS

Further objects and features of the invention will be apparent from the following description and from the drawings in which.

DESCRIPTION OF A PREFERRED EMBODIMENT

Figure 1:
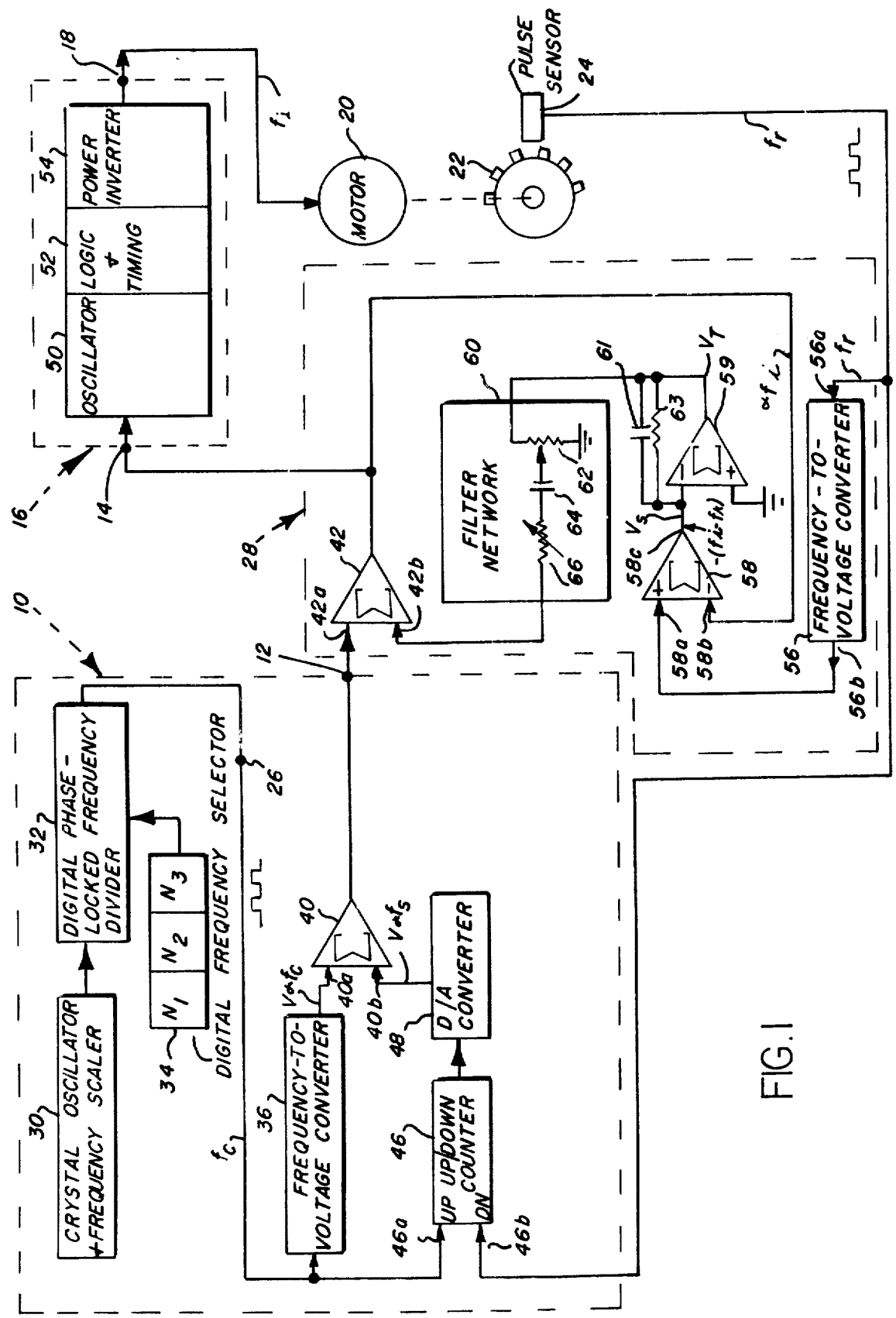
FIG. 1 shows schematically an inverter-driven induction motor with pulse feedback in a velocity-lock system for precise speed control, and employing also the damping technique of the present invention in a local feedback loop.

The present invention is a damping system for an inverter-driven induction motor, which, by a feedback technique, suppresses a tendency of the induction motor to resonate. The damping system is advantageously but not necessarily used in a motor driven system employing also a larger main feedback loop, because damping of the motor facilitates stabilization of the main feedback loop. A preferred embodiment of the invention, as employed in a high-performance speed and position control system for an induction motor, is shown in FIG. 1. The system of FIG. 1 is referred to as a velocity-lock system.

In the preferred embodiment, a signal generating circuit 10 produces a dc control signal at its output terminal 12 which serves as the principal frequency controlling signal for a static inverter 16. An output terminal 18 of the static inverter 16 has an ac signal which is connected to energize the stator windings of an induction motor 20. The motor 20 drives a mechanical load, not shown, and also drives a gear 22 whose teeth during rotation produce successive digital pulses in a sensor 24.

Pulses from the sensor 24 are employed as feedback signals to insure that the rotor of the induction motor 20 operates at precisely a speed dictated by a speed command signal on a command terminal 26, which is within the signal generator 10. The pulses from the sensor 24 are also employed as one input to a damping circuit 28, which is the principal subject matter of the present invention. The major components of the speed control and damping system of FIG. 1 will be described more fully.

The velocity-lock signal generator 10, as employed for controlling the inverter-driven induction motor 20, is described in detail in the O'Callaghan patent application cited above; for convenience, a brief description of its operation is included herein. A conventional crystal oscillator and frequency scaler 30 produce a reference signal of very stable frequency, which is connected to a digital phase-locked frequency divider 32. A frequency N1, N2, or N3, equal to a desired mechanical frequency of the rotor, is selected by means of controls 34, to establish a frequency $f_c$ at which the digital phase-locked frequency divider 32 operates.

The pulse train signal at the divider output 26 is connected to a frequency-to-voltage converter 36. The converter 36 provides a dc voltage signal that is proportional to the frequency $f_c$ to one input 40a of a summing amplifier 40. The output signal at the terminal 12 of the amplifier 40, which is the principal controlling signal for the inverter 16, is transmitted through another summing amplifier 42 to a control input terminal 14 of the static inverter 16.

The signal at the terminal 12 is a dc voltage signal proportional to an excitation frequency $f_i$ which it is desired to have the inverter 16 apply to the stator of the ac motor 20. The frequency $f_c$ at the command terminal 26 and the dc voltage at the terminal 40a are proportional to the desired rotor mechanical frequency $f_r$ of the ac motor 20, which is slightly lower than the stator excitation frequency $f_i$ provided by the power inverter 16.

A second signal is introduced to the summing amplifier 40 at a second input 40b of that amplifier. In a steady-state condition the dc signal at the input 40b is proportional to the slip frequency $f_s$. The dc signal at the terminal 40b representing slip frequency $f_s$ under steady-state conditions, is added to the dc signal at terminal 40a representing the desired rotor frequency $f_c$, by the summing amplifier 40, whose output signal in steady state represents the sum of the desired rotor frequency $f_c$ and the slip frequency $f_s$, this sum being representative of the stator excitation frequency $f_i$ produced by the inverter 16. When the speed error is zero, the actual rotor "mechanical frequency" $f_r$ is equal to the command frequency $f_c$. The expression "mechanical frequency" is used herein to denote some fixed multiple of the number of revolutions per minute made by the rotor. The slip frequency $f_s$ is ordinarily not zero even when the error frequency $(f_r - f_c)$ is zero.

The command frequency signal $f_c$ is connected to an upcounting terminal 46a of a bidirectional counter 46. The sensor 24, which senses each passage of a tooth of the gear 22, produces pulses at the rotor frequency $f_r$, which are applied to a down-counting terminal 46b of the up/down counter 46. When the actual rotor frequency $f_r$ is remaining equal to the command frequency $f_c$, the frequency $f_c$ of command pulses at the up-counting terminal 46a is equal to the frequency $f_r$ of pulses at the down-counting terminal 46b, and the up/down counter 46 experiences no progressive change in its count. The up/down counter 46 at this time of steady-state operation nevertheless has a constant residual count, which is necessary in order to provide a digital signal to a digital-to-analog (D/A) converter 48, whose output signal voltage is proportional to the necessary slip frequency $f_s$.

Upon a disturbance of the system which causes the actual rotor frequency $f_r$ to be different from the command frequency $f_c$, the up/down counter 46 experiences different frequencies of pulses at its input terminals 46a, 46b, and the accumulated count of the up/down counter 46 changes. Thereupon, the D/A converter 48 provides a different signal, which includes a component proportional to necessary slip and another component proportional to the integral of the speed error, at the terminal 40b, which causes the dc signal at the output terminal 12 of the summing amplifier 40 to be different. The changed signal at the terminal 12 is transmitted through an amplifier 42 to the input terminal 14 of the inverter 16, and the inverter 16 changes the frequency $f_i$ which it is producing, in response to the change of voltage applied to the terminal 14. The change in frequency $f_i$, which is the stator excitation frequency for the motor 20, alters the rotor frequency $f_r$ in such a direction as to correct the speed error $(f_r - f_c)$ of the rotor.

The amplifier 42 is not important to the operation of the known feedback velocity-lock loop which is now being described, being provided solely for injection of a damping signal produced by the novel damping network 28, which will be discussed below.

The inverter 16 receives a dc voltage at its input terminal 14 and applies it to a voltage-controlled oscillator 50 within the inverter 16, to produce the frequency $f_i$ proportional to the dc voltage applied. The conventional voltage-controlled oscillator 50 cooperates with conventional logic and timing circuits 52 and conventional power inverter equipment 54 in a manner which is very well known in the prior art of power inverters, to produce a powerful ac signal of frequency $f_i$ for energizing the stator of the induction motor 20. The large feedback loop just described, involving the signal generator 10, controls the speed and angular position of the motor 20.

A smaller feedback loop, involving the damping circuit 28, is employed for dynamically stabilizing the ac motor 20. Pulses at the frequency $f_r$ produced by the sensor 24 are applied at a terminal 56a to a frequency-to-voltage converter 56, which is part of the damping circuit 28. The frequency-to-voltage converter 56 produces an output voltage at a terminal 56b which is a dc voltage proportional to the rotor frequency $f_r$. The voltage at the terminal 56b, which represents the actual rotor speed, is connected to a terminal 58a of a difference amplifier 58. The difference amplifier 58 receives a second dc signal at a second input terminal 58b, which is proportional to the stator excitation frequency $f_i$, the second dc signal being equal to the signal at the input terminal 14 of the static inverter 16.

The amplifier 58 is a well-known type whose output signal is proportional to the difference between the signals applied at its two input terminals 58a, 58b. Consequently, a signal $V_s$ at an output terminal 58c of the amplifier 58 is proportional to the difference between the stator excitation frequency $f_i$ and the actual rotor frequency $f_r$. The signal $V_s$ is therefore proportional to the slip frequency $f_s$ of the motor 20. The signal $V_s$ from the amplifier 58 is applied to the input of a lag amplifier 59, which preferably has a feedback capacitor 61 in parallel with a resistor 63 to produce the phase lag. An output signal $V_T$ of lag amplifier 59 is approximately proportional to the air-gap torque of the motor 20. The air-gap torque or machine torque is the torque produced electrically by the motor 20, and is equal to the algebraic sum of the load torque and a component of torque employed for accelerating the inertia of the rotor and load. Consequently, the signal $V_T$ is a very desirable one for use in a motor damping network for adjusting and suppressing a tendency to resonance. The signal $V_T$ is applied to the input of a filter network 60, which advantageously consists of a variable resistor 62, a series capacitor 64, and a series-connected variable resistor 66. The signal $V_T$ is processed by the filter network 60 to produce a feedback signal at a second input terminal 42b of the summing amplifier 42. The lag amplifier 59 and the filter network 60 may be combined into a lead/lag filter for convenience.

The amplifier 42 adds the output signal of the filter network 60 to a principal control signal which is present at its other terminal 42a, so that the input terminal 14 of the inverter 16 receives two components of signal, one being proportional to the output of the amplifier 40 and the other being proportional to the damping signal at the terminal 42b. By adjustment of the filter network 60, for example by adjustment of the variable resistors 62 and 66, the motor 20 can be critically damped, under-damped, or overdamped as desired. The resistor 62 adjusts mainly the amplitude of the feedback signal, and the resistor 66 adjusts mainly the frequency of the lower-frequency corner of a frequency-response curve of the filter network 60. The adjustable damping of the motor 20 through the small feedback loop involving the damping network 28 greatly facilitates stabilization of the entire system involving the larger loop including the signal generator 10, and permits achievement of fast and accurate over-all system response.

Upon a disturbance of the system, for example a transient mechanical load on the rotor shaft or a spurious noise in a signal circuit, the air-gap torque of the motor 20 changes. Because the signal $V_T$ at the output of the lag amplifier 59 is proportional to the air-gap torque, this change in air-gap torque is simulated as a change in the signal $V_T$. The filter network 60 processes this transient signal so as to produce, at the output of the filter network 60, a signal of appropriate amplitude and phase to tend to suppress ringing of the motor system. The suppressing signal at the terminal 42b is transmitted through the amplifier 42 to the inverter 16 to produce a corrective change transiently in the frequency $f_i$. This change in frequency $f_i$ is in an appropriate direction and magnitude to damp the incipient resonance of the motor 20. It is clear from FIG. 1 and the foregoing description that the filters 59 and 60 of the damping network 28 are not limited to conditioning of signals representing any particular value of slip, but rather are capable of conditioning signals irrespective of whether they represent values of slip below, at, or above a pull-out level of slip for the motor 20. The pull-out level of slip is the slip corresponding to a pull-out torque condition, where pull-out torque is the maximum torque that the motor is capable of providing.

Figure 2:
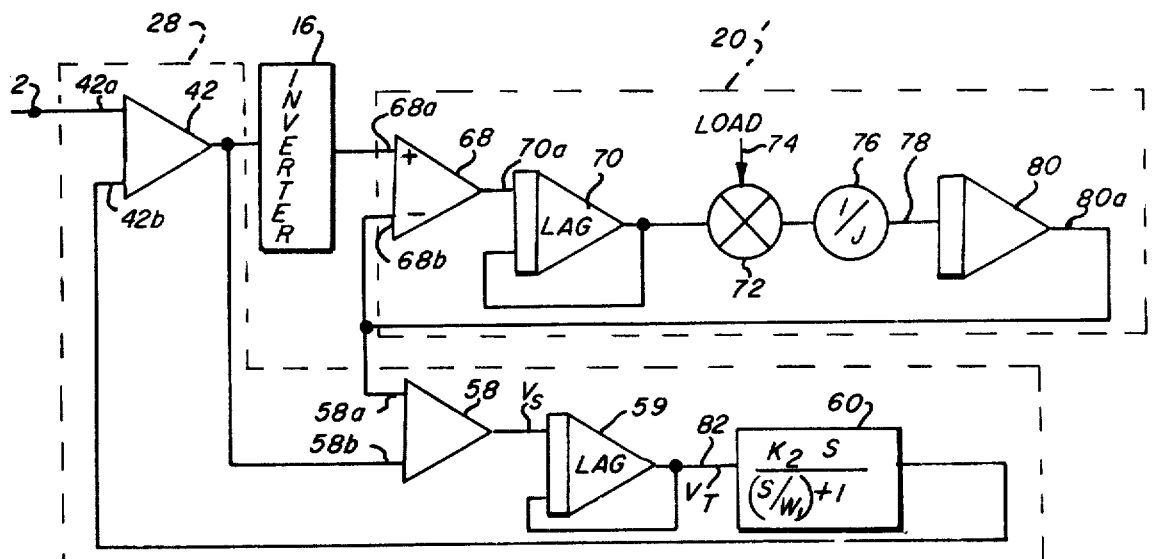
FIG. 2 is a schematic diagram that is believed to be an equivalent circuit of the inverter, the motor, and the local feed-back circuit portions of FIG. 1, forming a practically achievable damping circuit.
Figure 3:
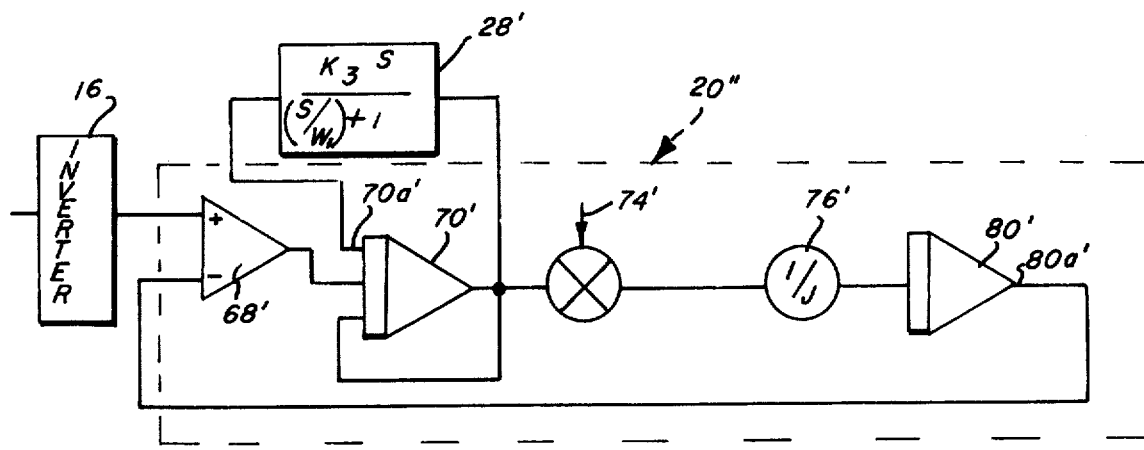
FIG. 3 is a simplified circuit equivalent to that of FIG. 2 except having a damping network which is physically unachievable, and which shows the suitability of the circuit of FIG. 2.

With the aid of equivalent circuit diagrams of FIGS. 2 and 3, the damping system 28 described above can be shown to be effective for damping the induction motor 20. FIG. 2 shows the damping circuit 28 connected to the induction motor 20 in the same manner as in FIG. 1 except that the motor 20 is represented in FIG. 2 by an approximately equivalent electrical circuit. The main speed feedback loop involving the signal generator 10 is not shown in FIG. 2.

The inverter 16 is connected intermediates the output terminal of the summing amplifier 42 and the input terminal 68a of the equivalent circuit 20', which represents the induction motor 20. A difference amplifier 68 is an analog equipment representation of a phenomenon that occurs within the induction motor 20, namely that the rotor of the motor has currents induced in its conductors whose frequency is the slip frequency. The amplifier 68 subtracts the rotor mechanical frequency $f_r$ that is represented as a dc voltage at a terminal 68b, from the stator frequency $f_i$ that is represented as a dc voltage at a terminal 68a, to produce at the output of the amplifier 68 a dc voltage proportional to the slip frequency $f_s$.

An integrating amplifier 70 represents an experimentally observed lag effect that is believed to occur between slip and air-gap torque, FIG. 2. The output of the integrating amplifier 70 represents the air-gap torque, which is the electrical torque transmitted from the stator to the rotor through fields in the air gap of the induction motor.

A summing junction 72 is included in the equivalent circuit diagram of the motor 20 to represent a subtraction process that occurs between the air-gap torque and a load torque, the load torque being represented by an input signal 74 to the summing junction 72. The air-gap torque and the load torque are generally of opposite signs.

The difference between the air-gap torque and the load torque is a torque that is present to accelerate the rotor and the load when such acceleration (of either sign) occurs. This difference torque is applied to an inertia load J represented by the circle 76 of the equivalent circuit of FIG. 2, and the difference torque accelerates the inertia J to produce an acceleration, which is represented by an analog signal on a conductor 78. The acceleration at the conductor 78 is integrated by an analog integrator 80 to produce a velocity signal at the output terminal 80a of the integrator 80, this velocity signal representing the angular velocity $f_r$ of the rotor.

The angular velocity signal of the rotor is applied both to the difference amplifier terminal 68b and to the first input terminal 58a of damping circuit 28. The feedback from the terminal 80a to the input terminal 68b of the equivalent circuit is believed to be the internal motor feedback that results in the tendency of the induction motor 20 to resonate when it is subjected to input transients at the terminal 68a or to transients of load torque 74. Because a first integration occurs in the lag circuit 70 and a second integration occurs in the integrator 80, the induction motor is represented mathematically by a second-order differential equation.

A second input for the summing amplifier 58 is obtained from the output of the amplifier 42 and is applied to the second input terminal 58b of the amplifier 58, FIG. 2. A lag amplifier 59 simulates the motor lag of the amplifier 70. The filter network 60 is represented in FIG. 2 by its transfer-function whose numerator is $K_2s$ and whose denominator is $(s/w_i)+1$, wherein $K_2$ is a constant, s is a variable of the Laplace transform domain, and $w_i$ is a predetermined angular frequency. The amplifier 42 receives the principal input signal from the terminal 12 at a first input terminal 42a, and receives the damping input signal at the second input terminal 42b, the latter signal being received from the filter network 60 of the damping network 28. Collectively, the lag amplifier 59 and the filter network 60 are a means for retarding the phase angle of the slip signal $V_s$ in a first frequency range and for advancing the phase angle in a second frequency range.

The operation of the equivalent circuit of FIG. 2 is as follows: Upon a disturbance of the system of FIG. 2 that results transiently in a change in the rotor frequency $f_r$ as represented by the analog signal at the terminal 80a, the damping network 28 receives a signal at its input terminal 58a which represents the rotor frequency $f_r$. The second input terminal 58b of the amplifier 58 receives at the same time a signal representative of the stator frequency $f_i$, from the output of the amplifier 42. The difference signal $V_S$ at the output of the amplifier 58 represents the slip frequency $f_s$. After this signal is processed by the lag amplifier 59, a signal $V_T$ is produced which is proportional to the torque, at the terminal 82. This air-gap torque signal is further processed by the lead filter network 60 to produce an appropriate damping signal, which is applied to the terminal 42b to suppress the tendency of the motor 20 to ring in response to the original disturbance. Thus, the damping network 28 is seen to suppress the tendency of the motor 20 to resonate and hence, to permit the motor 20 to be more easily stabilized when it is employed in a larger feedback loop such as the feedback loop involving the signal generator 10.

By the writing of routine equations in a manner that is well known to those skilled in the feedback systems art, the circuit of FIG. 2 can be shown to have the same response to signals as does a much simpler equivalent circuit, shown in FIG. 3. The equivalent circuit of FIG. 3 shows the induction motor 20 in the form of an equivalent circuit 20'' identical to the equivalent circuit of FIG. 2 except that connections are provided from the output of the amplifier 70 and to an additional input 70a of the amplifier 70.

A corrective feedback circuit 28' which, if physically achievable, would take the place of the damping network 28, is shown connected from the output of the amplifier 70 to the input 70a to perform a damping function in FIG. 3 similar to the damping function performed in FIG. 2 by the damping network 28. The network 28' is a filter network whose transfer function is believed to be identical in form with the transfer function of the filter network 60 of the damping network 28. In the form in which the circuit is shown in FIG. 3, it will be clear to those skilled in the feedback systems art that the parameters of the corrective filter network 28' can be chosen to effectively damp the second-order system which is represented by the equivalent circuit 20'' of motor 20. The characteristic system equation which governs the response of the circuit of FIG. 3 to signals, is identical in form to the corresponding characteristic equation of FIG. 2, which is a physically realizable circuit.

The circuit of FIG. 3 cannot be physically achieved in a convenient manner however, while that of FIG. 2 can be physically achieved. A signal representing the output of the amplifier 70' is not accessible for convenient connection to an external network such as the network 28'. Consequently, the signal at the output of amplifier 70, which represents the machine torque transmitted across the air gap of the induction motor, is simulated at the point 82 of FIG. 2 by means of the external circuit components 58 and 59. The signal $V_T$ at the point 82 is then applied to the filter network 60 to process the phase and amplitude of the signal in the same manner as the air-gap torque signal of FIG. 3 would be processed by the filter network 28'.

The output of the filter network 60 cannot be applied directly to a terminal of FIG. 2 corresponding to the terminal 70a' of FIG. 3 because no such terminal is readily accessible in the motor. Instead, the output of the network 60 is applied to the terminal 42b which, upon appropriate adjustment of the circuit constants, has the same effect as applying the signal to the terminal 70a' of FIG. 3 so far as the damping action is concerned. FIG. 3, although it is physically unachievable, is presented as a simplified version of FIG. 2 because the connection in FIG. 3 of the filter network 28' will be recognized by those who are skilled in the feedback systems art as being a familiar connection for damping a second-order system. The somewhat more complex and physically achievable system of FIG. 2 has been shown to perform the same function as the physically unachievable but more familiar circuit of FIG. 3.

The damping system can be employed to stabilize velocity-lock digitally controlled inverter-driven induction motor systems as described herein, and also inverter-driven induction motor drives that have tachometer feedback from the rotary shaft, and other related types of induction motor controls.

We claim:

1. Stabilizing apparatus for use with an inverter-driven induction motor system having an inverter responsive to a principal control signal to produce ac excitation for the stator of the motor comprising sensor means for sensing the speed of the rotor of the motor and for producing a first signal dependent thereon, circuit means for producing a second signal in accordance with the frequency of power with which the stator of said motor is excited by said inverter, algebraic combining means for combining said first and second signals to produce a third signal representative of the slip frequency of said motor, frequency-dependent filter means receiving said third signal for producing a filtered fourth signal in response to said third signal at least at times when said third signal is substantially below a pull-out level, and means for controlling said inverter in accordance with both said fourth signal and said principal control signal.

2. Stabilizing apparatus as defined in claim 1 and wherein said means for controlling said inverter in accordance with said fourth signal comprises algebraic summation means receiving said fourth signal and said principal control signal and producing a sum signal in response thereto for controlling said inverter.

3. Stabilizing apparatus as defined in claim 2 and wherein said second signal is obtained from the sum signal output of said algebraic summation means.

4. Stabilizing apparatus as defined in claim 1 and wherein said frequency-dependent filter means comprises electric lead/lag filter means.

5. Stabilizing apparatus as defined in claim 4 and wherein said lead/lag filter means comprises a lag filter having lag characteristics matched to the lag of said motor between slip and air-gap torque.

6. Stabilizing apparatus as defined in claim 4 and wherein said lead/lag filter means comprises means for critically damping said induction motor.

7. Stabilizing apparatus as defined in claim 1 and wherein said sensor means comprises means for producing successive pulses upon rotation of said rotor and frequency-to-voltage converter means for converting said successive pulses to said first signal, said first signal comprising a dc signal varying in accordance with the frequency of said pulses.

8. Stabilizing apparatus as defined in claim 1 and further comprising speed feedback means for controlling rotor speed, said speed feedback means including command signal means for producing a command signal specifying a desired speed of said rotor, rotation sensing means for producing a feedback signal in dependence upon the rotation of said rotor, comparator means for comparing said command signal with said feedback signal and for producing a position error signal in accordance with an accumulated difference between said command and feedback signals, said comparator means including means for producing an offsetting signal corresponding to the slip of said motor, and combining circuit means for combining said command signal and said position error signal and said offsetting signal to produce said principal control signal for said inverter.

9. A system for controlling an induction motor comprising means for producing a principal control signal, inverter means responsive to said principal control signal to produce an ac voltage for energizing the stator windings of said motor, sensor means responsive to incremental changes in the angular position of the rotor of said motor for producing feedback frequency signals in respsonse to said incremental changes of position, conversion means for converting said feedback frequency signals to current feedback signals responsive to the feedback frequency, circuit means for providing a signal representing the frequency of ac voltage produced by said inverter, means for producing a slip signal having a magnitude which represents the slip frequency of said motor including means for subtracting said signal representing the inverter frequency from said current feedback signal to produce said slip signal, filter means for attenuating and phase-shifting said slip signal including at least slip signal values substantially below a pull-out level, and means for connecting the output signal of said filter means with said inverter to combine with said command signal in controlling said inverter.

10. Stabilizing apparatus as defined in claim 9 and wherein said filter means comprises lag filter means simulating an internal lag in said motor between slip and air-gap torque, and further comprises lead network filter means for simulating feedback around said internal lag, to damp said motor.

11. Stabilizing apparatus for an inverter-driven induction motor system having a principal control signal controlling said inverter comprising circuit means for producing a signal representing the slip of said motor, filter means receiving said slip signal and attenuating and shifting the phase thereof differently for different frequencies of variation of said slip signal and operative at least for slip signal values substantially below a pull-out level, and means for combining the attenuated phase-shifted signals from said filter means with the principal control signal to control the resonant frequency and damping of said inverter-driven motor system.

12. A method of stabilizing an induction motor that is energized by an inverter having a principal inverter input signal comprising the steps of providing a first signal proportional to the slip, passing said first signal through a lag circuit to produce a second signal proportional to air-gap torque, passing said second signal through a stabilizing filter to produce a third signal, utilizing said third signal as a feedback signal by combining said third signal with the principal inverter input signal to produce a fourth signal, and controlling said inverter with said fourth signal and the principal input signal.

13. A method as defined in claim 12 and wherein said step of providing a first signal proportional to the slip comprises sensing the rotor speed of said motor and producing a fifth signal in response thereto, and subtracting said fifth signal from said fourth signal to produce said first signal.

14. Stabilizing apparatus for use with an inverter-driven induction motor system having an inverter responsive to a principal control signal to produce ac excitation for the stator of the motor comprising sensor means for sensing the speed of the rotor of the motor and for producing a first signal dependent thereon, circuit means for producing a second signal in accordance with the frequency of power with which the stator of said motor is excited by said inverter, algebraic combining means for combining said first and second signals to produce a third signal representative of the slip frequency of said motor, frequency-dependent filter means for producing a filtered fourth signal in response to said third signal, and means for controlling said inverter in accordance with both said fourth signal and said principal control signal, and wherein said frequency-dependent filter means comprises lead/lag filter means including resistance and reactance means for retarding the phase angle of said fourth signal with respect to said third signal in a first frequency range and for advancing the phase angle of said fourth signal with respect to said third signal in a second frequency range and further comprises means for manually adjusting the phase-changing characteristics of said lead/lag filter means.

15. Stabilizing apparatus for use with an inverter-driven induction motor system having an inverter responsive to a principal control signal to produce ac excitation for the stator of the motor comprising sensor means for sensing the speed of the rotor of the motor and for producing a first signal dependent thereon, circuit means for producing a second signal in accordance with the frequency of power with which the stator of said motor is excited by said inverter, algebraic combining means for combining said first and second signals to produce a third signal representative of the slip frequency of said motor, frequency-dependent filter means for producing a filtered fourth signal in response to said third signal, and means for controlling said inverter in accordance with both said fourth signal and said principal control signal, and further comprising speed feedback means for controlling rotor speed, said speed feedback means including command signal means for producing a command signal specifying a desired speed of said rotor, rotation sensing means for producing a feedback signal in dependence upon the rotation of said rotor, comparator means for comparing said command signal with said feedback signal and for producing a position error signal in accordance with an accumulated difference between said command and feedback signals, said comparator means including means for producing an offsetting signal corresponding to the slip of said motor, and combining circuit means for combining said command signal and said position error signal and said offsetting signal to produce said principal control signal for said inverter, and wherein said rotation sensing means comprises pulse sensing means for producing pulses at a frequency responsive to the speed of said motor, said command signal meanss comprises frequency signal means whose command signal frequency specifies the desired speed of said rotor, said combining circuit means comprises frequency-to-voltage converter means for converting said command signals to a corresponding dc voltage, said comparator means comprises up/down counter means responsive to count in opposite directions in response to said feedback signal and said command signal respectively, said offsetting signal means comprises means for storing a residual difference between the number of up counts and the number of down counts received by said up/down counter, and said frequency-dependent filter means comprises a lead/lag filter.

* * * * *